United States Patent
Yang et al.

(10) Patent No.: US 6,627,030 B2
(45) Date of Patent: Sep. 30, 2003

(54) VARIABLE LAMINATION MANUFACTURING (VLM) PROCESS AND APPARATUS

(75) Inventors: Dong-Yol Yang, Taejon (KR); Dong-Gyu Ahn, Taejon (KR); Bo-Sung Shin, Taejon (TW); Sang-Ho Lee, Pusan (KR)

(73) Assignee: Korea Advanced Institute of Science and Technology, Taejon (KR)

( * ) Notice: Subject to any disclaimer, the term of this patent is extended or adjusted under 35 U.S.C. 154(b) by 82 days.

(21) Appl. No.: 09/804,175

(22) Filed: Mar. 12, 2001

(65) Prior Publication Data

US 2001/0040003 A1 Nov. 15, 2001

(30) Foreign Application Priority Data

Apr. 7, 2000 (KR) ........................................ 2000-18175

(51) Int. Cl.$^7$ .................. B32B 31/18; B32B 31/20; B32B 31/12; H05B 6/00
(52) U.S. Cl. ................ 156/250; 156/256; 156/264; 156/267; 156/272.2; 156/275.7; 156/379.8; 264/405; 425/110
(58) Field of Search ...................... 256/64, 256, 250, 256/264, 267, 272.2, 273.3, 273.5, 273.7, 275.7, 290, 291, 370.8, 380.9, 516, 522; 264/405, 409; 425/110

(56) References Cited

U.S. PATENT DOCUMENTS

| 4,752,352 A | | 6/1988 | Feygin |
| 5,578,155 A | * | 11/1996 | Kawaguchi .................. 156/267 |
| 5,730,817 A | * | 3/1998 | Feygin et al. .................. 156/64 |
| 5,943,775 A | | 8/1999 | Lanahan et al. |
| 6,056,843 A | * | 5/2000 | Morita et al. ................ 156/250 |

FOREIGN PATENT DOCUMENTS

| EP | 846549 A2 | * | 6/1998 | ........... B29C/67/00 |
| WO | WO 91/12957 | * | 9/1991 | ............. B32B/1/00 |

* cited by examiner

Primary Examiner—Jerry A. Lorengo
(74) Attorney, Agent, or Firm—Vidas, Arrett&Steinkraus PA

(57) ABSTRACT

Disclosed herein is a variable lamination manufacturing process and apparatus. The method comprises the step of coating strip-shaped material with an adhesive while the strip-shaped material is fed. Thereafter, the strip-shaped material being fed is cut into material pieces of a variable width, variable inclinations and a variable length in accordance with the three-dimensional computer aided design data of a three-dimensional product using a linear heat source. The cut material pieces are stacked on a moving table to be positioned in the corresponding positions of the three-dimensional product. Finally, the stacked cut material pieces are pushed to bond one piece to anther.

6 Claims, 17 Drawing Sheets

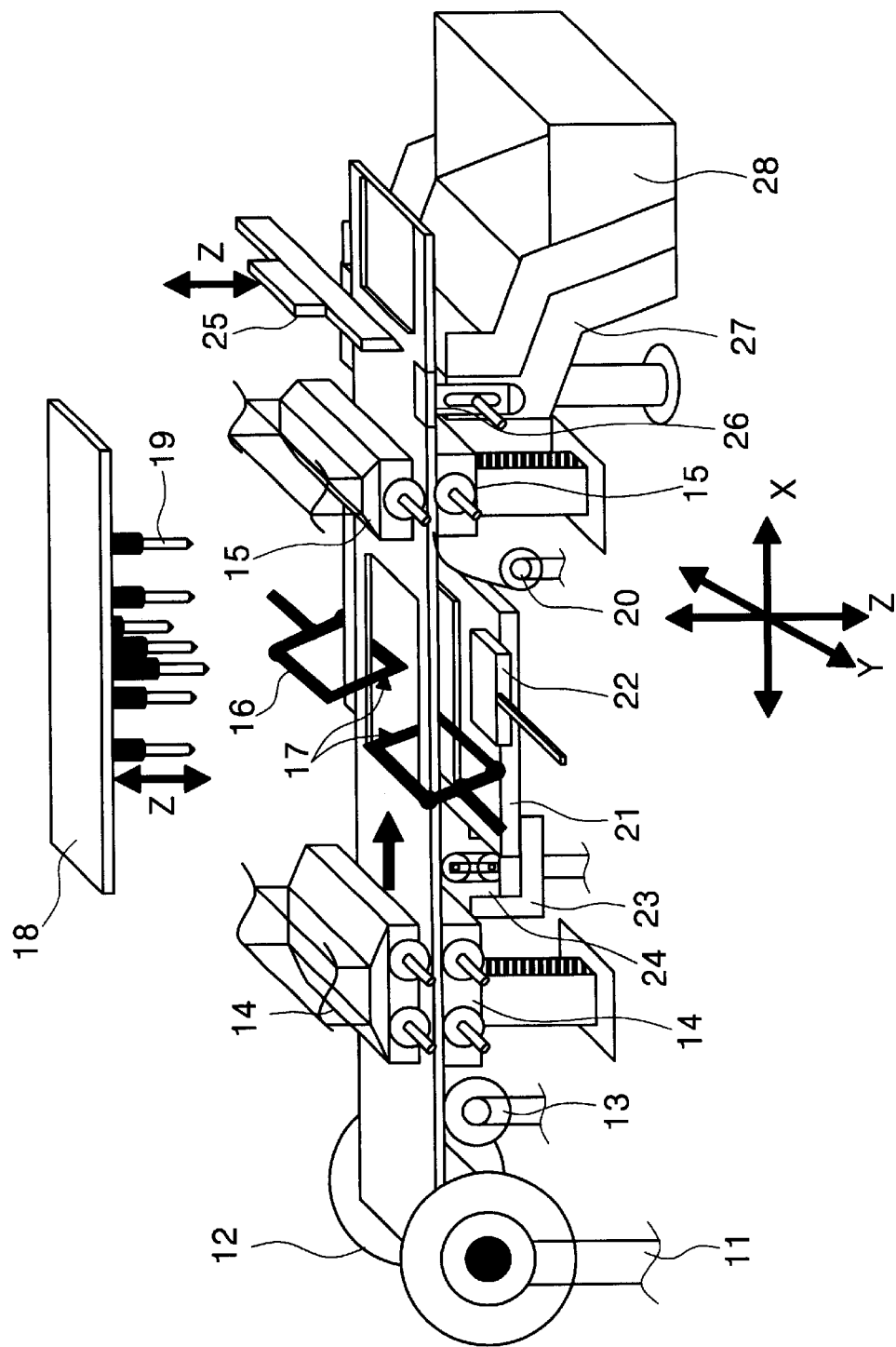

SECTION A-A

DETAILED VIEW OF PORTION "B"

SECTION C-C

SECTION D-D

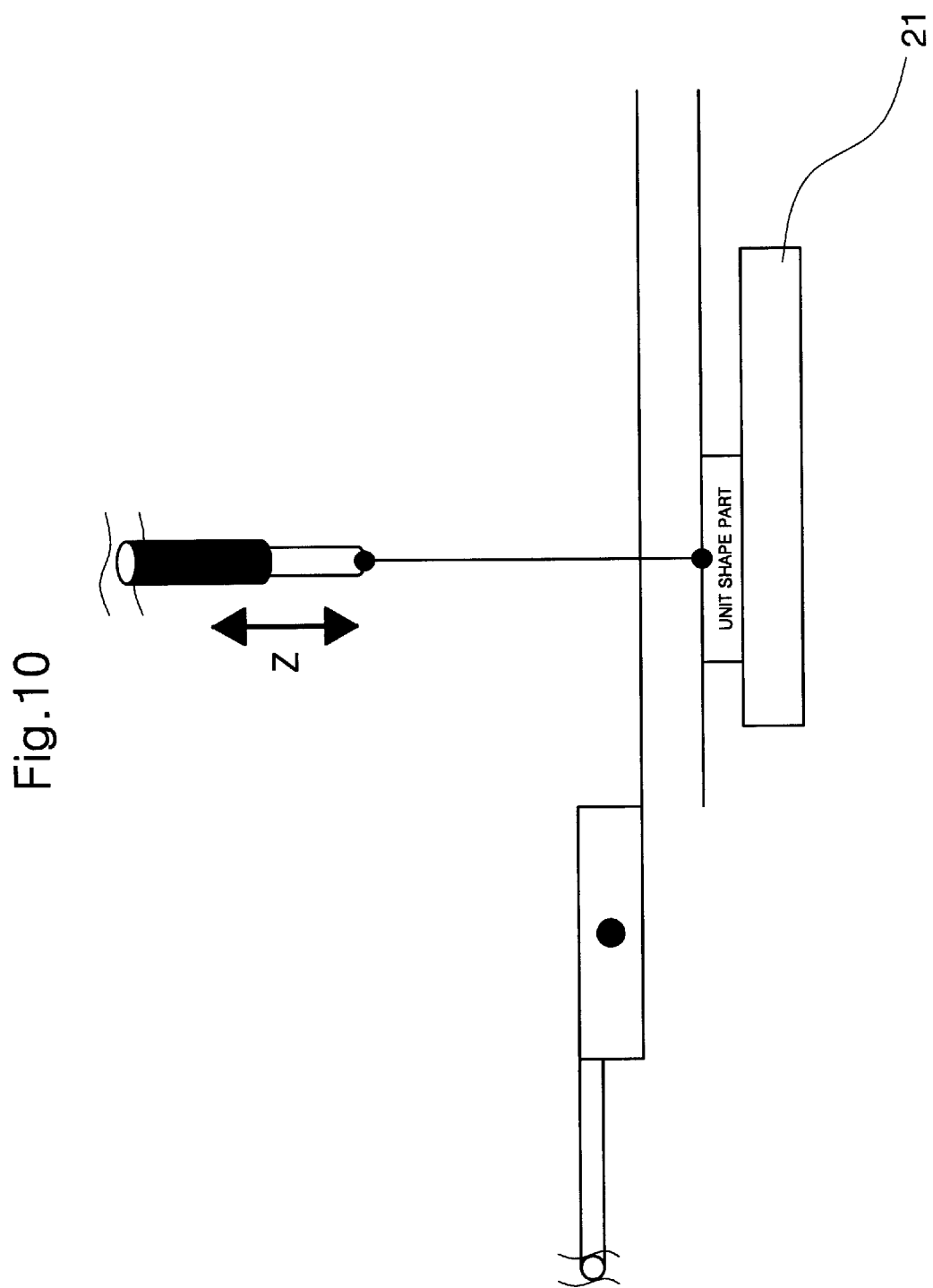

VARIABLE LAMINATION MANUFACTURING (VLM) PROCESS AND APPARATUS

BACKGROUND OF THE INVENTION

1. Field of the Invention

The present invention relates generally to a variable lamination manufacturing (VLM) process and apparatus, and more particularly to a variable lamination manufacturing (VLM) process and apparatus, which is capable of fabricating a three-dimensional product by cutting strip-shaped material, such as foamed resin, thermoplastic resin, thermosetting resin, etc., into the unit shape part of variable width, inclinations and length using a four-degree-of-freedom linear heat cutting device, and stacking and bonding together the cut unit shape parts while the material is supplied in variable widths and thicknesses.

In addition, the present invention relates to a rapid prototyping method that is capable of obviating the need for post-processing and considerably reducing build time by improving the dimensional accuracy of the product in comparison with conventional rapid prototyping methods for fabricating trial products and molds.

2. Description of the Prior Art

A rapid prototyping method in accordance with the present invention can be utilized in various industrial uses, such as the fabrication of architectural models, trial products (of the turbine blades of aircrafts, of the impeller of centrifugal compressors, of cellular phones, or of the like), character products (such as Pikachu dolls, Dooly dolls, or the like), cores for lost foam casting, or the like. In particular, the rapid prototyping method can be utilized in the rapid production of parts each having three-dimensional shape that cannot be fabricated by a three or five-axial cutting process.

The conventional rapid prototyping methods may be classified into a method of hardening liquid material into a three-dimensional shape by the irradiation of laser beams and a method of bonding solid material in the form of particles or laminates into a product of a desired shape.

In the above description, the rapid prototyping method denotes a fabricating method of fabricating nonmetallic or metallic material, such as paper, wax, ABS or plastic, directly into a trial product or mold of a three-dimensional shape using three-dimensional computer aided design data. Recently, various materials such as metallic powder and metallic wire have been developed to be utilized as material for rapid prototyping methods.

In the meantime, stereolithography, one of the hardening methods, developed by 3D System Company is a method wherein a liquid photopolymer is selectively irradiated by laser beams to be solidified and one polymer layer is stacked on top of another.

As the stereolithography, there are known a method of partially irradiating laser beams commercialized by 3D System Co., Quadrax Co., Sony Co. and Dupont Co. and a method of irradiating a layer at a time using an ultraviolet lamp commercialized by Cubital Co. and Sculpting Co.

However, the stereolithography has a shortcoming in that solidified photopolymer contracts during hardening, thus being deformed. In addition, when a product having a protrusion is fabricated, there occurs a shortcoming that a support is needed to support photopolymer used to form the protrusion and prevents it from falling down. Furthermore, resin should be employed for the stereolithography, so that the strength of a product is reduced, thereby preventing the product from being functionally utilized.

As the method using powdered material, there are known selective laser sintering commercialized by DTM Co. and three dimension printing commercialized by Solingen Co., Z Corp., etc. and developed by MIT.

In the selective laser sintering, a product is fabricated in such a way that powdered plastic material is spread and the powder material is boned together by the irradiation of laser beams. The selective laser sintering is used to fabricate a metallic product and a mold using iron powder coated with plastic.

When a metallic product or mold is fabricated using iron powder coated with plastic, the plastic should be removed and the iron powder should be sintered to be combined together. In addition, there is required post-processing, such as copper infiltration, to fill in gaps between among iron powder. However, the selective laser sintering has a shortcoming in that dimensional accuracy cannot be achieved because the material is contracted during the post-processing.

In the three-dimensional printing, a liquid bonding agent is selectively added to spread powder to form a product. Using such three-dimensional printing, a ceramic shell for investment casting can be made of ceramic powder, or a product can be made of powder including starch as a chief ingredient. However, the three-dimensional printing has a shortcoming in that contraction occurs due to thermal deformation because post-processing is required to increase the density and strength of a product.

In the laminated object manufacturing commercialized by Helisys Co., a product is fabricated by repeating a process of bonding together multiple pieces of paper in the form of thin films and cutting bonded papers using a laser beams. However, though the laminated object manufacturing has an advantage in that the manufacturing cost of a product is low because paper is used as raw material, it has a defect in that labor is required to remove a finished product from surrounding excess material after the fabrication of the product.

For example, in a case where a spherical product is fabricated, when the spherical product is fabricated by stacking and cutting multiple pieces of paper, labor is required to remove the finished spherical product from the remaining paper portion because the spherical product is surrounded by the remaining paper portion. Though plastic thin plate has been developed and can be utilized in fabricating a plastic product, there occurs also the same shortcoming as that with paper.

In accordance with fused deposition modeling commercialized by Stratasys Co., a product is fabricated in such a way that plastic material in the form of filaments is passed between heated nozzles each having a shape similar to an extrusion die and is bonded together while being melted. However, such fused deposition modeling has a shortcoming in that the surface of the product is rough because material in the form of filaments is employed.

Hereinafter, a rapid prototyping method for a product of functional material such as metal or a mold is described.

In laser engineered net shaping developed by Santia National Lab and recently commercialized by Optomec Co., a product is fabricated in such a way that metallic substrate is partially heated to form a melted pool and metallic powder is dropped into the melted pool using gas.

However, the laser engineered net shaping has a shortcoming in that dimensional accuracy of a product is deteriorated due to deformation during solidification because a product is fabricated of melted metal. Additionally, the laser engineering net shaping has a shortcoming in that a product having a protrusion or cantilever cannot be fabricated because a product is fabricated of melted material.

Shape deposition manufacturing developed by Stanford Univ. and Carnegie Mellon Univ. is a technique in which a metallic deposition is combined with CNC machining. In the shape deposition manufacturing, metal is deposited and machined to have a desired thickness and a boundary shape using a CNC milling, the remaining portion in the same plane is filled with another metal, and the material is CNC-machined to form a layer. After the layer is completed, shot peening is performed to eliminate residual stress. A desired product is completed through the above-described series of processes.

However, the shape deposition manufacturing has a shortcoming in that a long time is required to fabricate a product because a plurality of processes are performed to complete a product.

SUMMARY OF THE INVENTION

Accordingly, the present invention has been made keeping in mind the above problems occurring in the prior art, and an object of the present invention is to provide a rapid prototyping method and apparatus in which material, such as foamed resin, thermoplastic resin and thermosetting resin, in the form of a strip is cut and cut material pieces are bonded together and stacked using a four-degree-of-freedom linear heat-cutting device to have a desired width, inclinations and length in accordance with the computer aided design data of a product while the material is continuously supplied, thereby reducing a manufacturing time, improving the dimensional accuracy of manufactured products and decreasing the loss of material.

In order to accomplish the above object, the present invention provides a variable lamination manufacturing (VLM) process, comprising the steps of: coating strip-shaped material with a bonding agent while the strip-shaped material is conveyed; cutting the strip-shaped material being conveyed into material pieces of a variable width, variable inclinations and a variable length in accordance with the three-dimensional computer aided design data of a three-dimensional product using a linear heat source; stacking the cut material pieces on a moving table to be positioned in the corresponding positions of the three-dimensional product; and pushing the stacked cut material pieces to bond one piece to anther.

In accordance with a feature of the present invention, the method further comprises the step of cutting and storing the remaining material except for the cut material pieces.

In accordance with a feature of the present invention, the linear heat source is one of hot wire, laser, plasma, heat beam and heated gas.

In accordance with a feature of the present invention, the strip-shaped material is one of foamed resin, thermoplastic resin and thermosetting resin.

In addition, a variable lamination manufacturing (VLM) process, comprising: feed means for feeding a strip-shaped material; conveying means for horizontally conveying the strip-shaped material; coating means for coating the lower surface of the strip-shaped material with a bonding agent; cutting means for cutting the strip-shaped material being conveyed into material pieces in a variable width, inclinations and a length in accordance with the three-dimensional computer aided design data of a three-dimensional product using a linear heat source; holding and moving means for holding a cut piece and vertically moving the cut piece; and positioning means for three-dimensionally moving the cut material pieces so as to position the cut material pieces in place for a three-dimensional product.

In accordance with a feature of the present invention, the apparatus further comprises means for cutting and storing the remaining material except for the pieces used in fabricating the product.

In accordance with a feature of the present invention, the apparatus further comprises a paper feed roller, the paper feed roller supplies paper to the lower surface of the remaining material so as to prevent a bonding agent coated on the lower surface of the remaining material from being smeared on the conveying means when the remaining material passes through the conveying means.

In accordance with a feature of the present invention, the cutting means is a four-degree-of-freedom linear heat cutter that can perform translation and rotation.

In accordance with a feature of the present invention, the apparatus further comprises a pushing device, the pushing device pushing cut pieces stacked on the conveying means so as to bond one piece to another.

BRIEF DESCRIPTION OF THE DRAWINGS

The above and other objects, features and other advantages of the present invention will be more clearly understood from the following detailed description taken in conjunction with the accompanying drawings, in which:

FIG. 2 is a schematic diagram showing a variable lamination manufacturing apparatus in accordance with the present invention;

FIG. 10 is a view showing the pushing device of a variable lamination manufacturing apparatus of FIG. 2;

DESCRIPTION OF THE PREFERRED EMBODIMENTS

Figure 1:
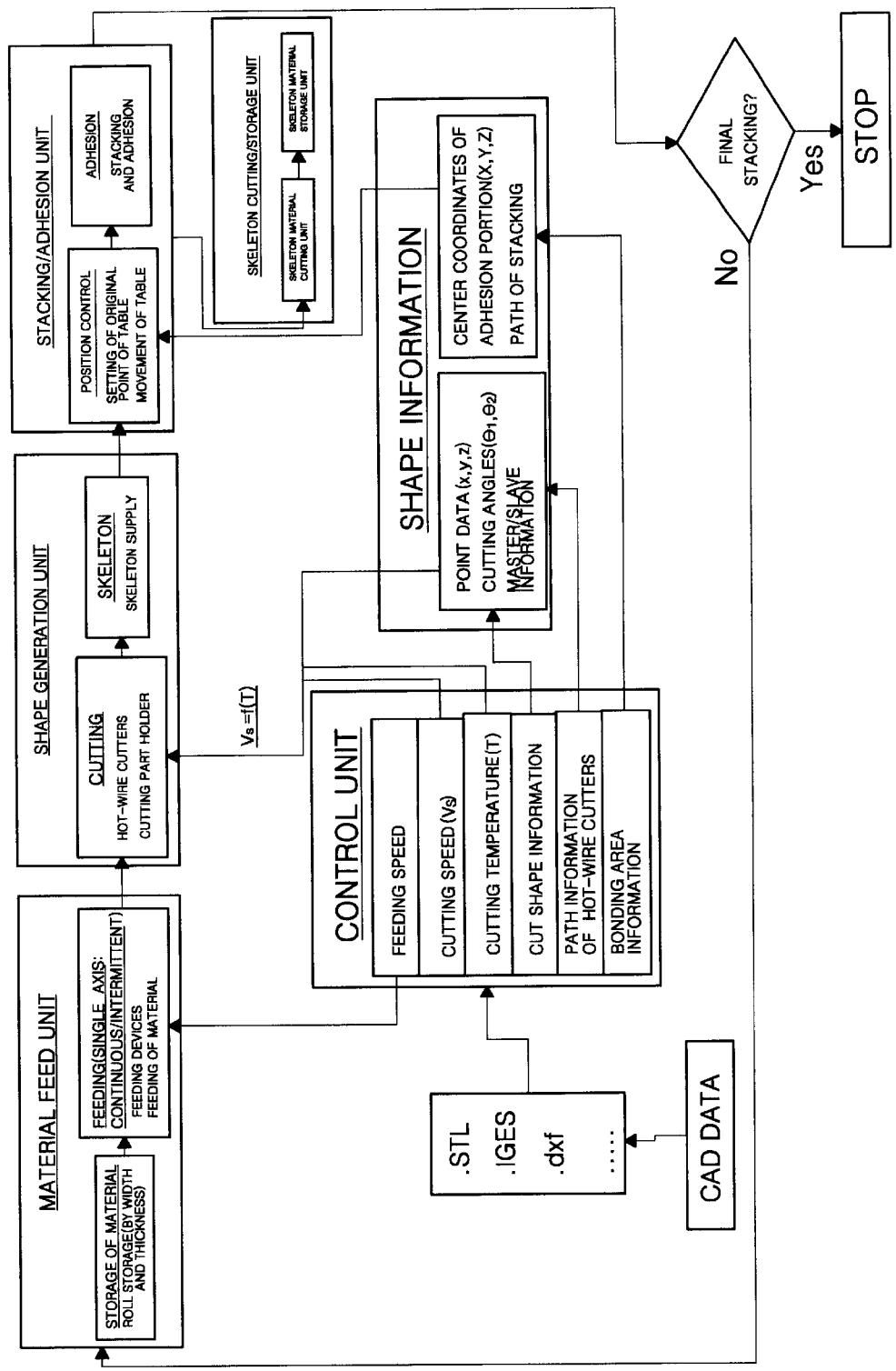
FIG. 1 is a schematic diagram showing a variable lamination manufacturing (VLM) process in accordance with the present invention.
Figure 3A:
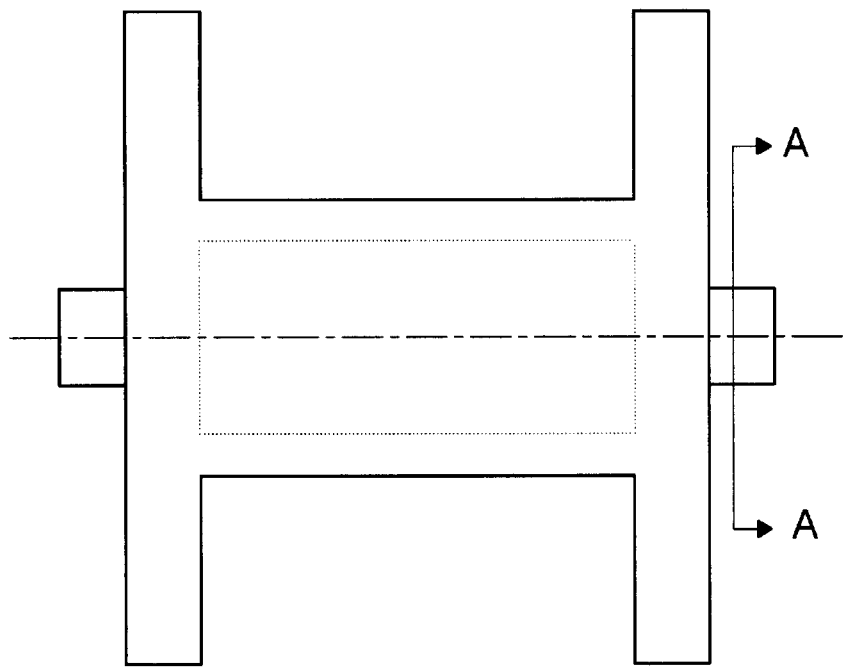
FIGS. 3a to 3d are views showing the material feed roll and roll support of a variable lamination manufacturing apparatus of FIG. 2.
Figure 3B:
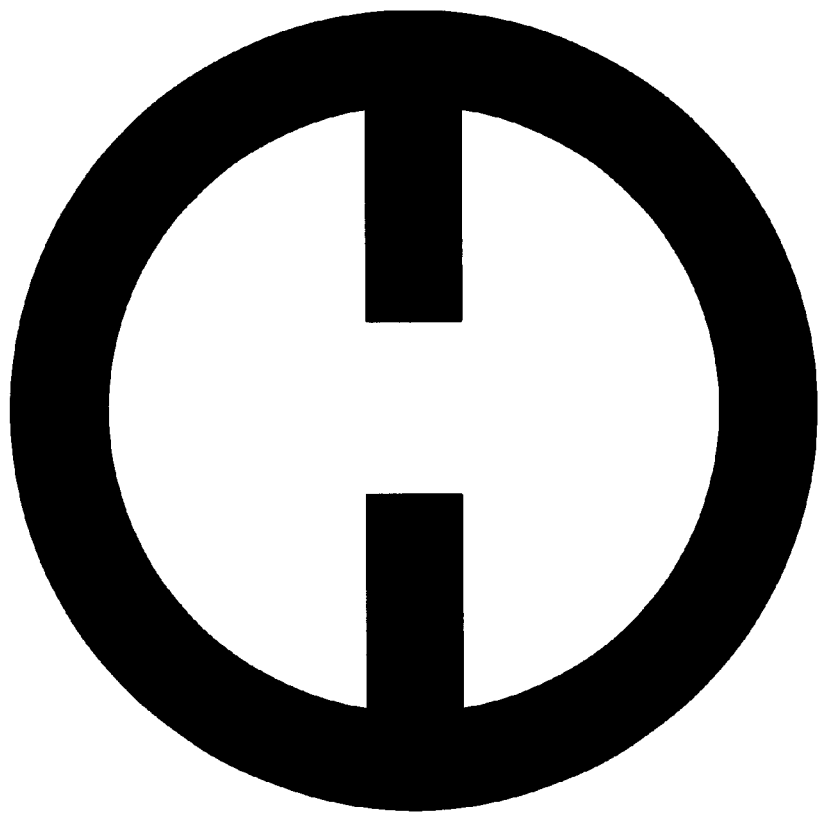
Figure 3C:
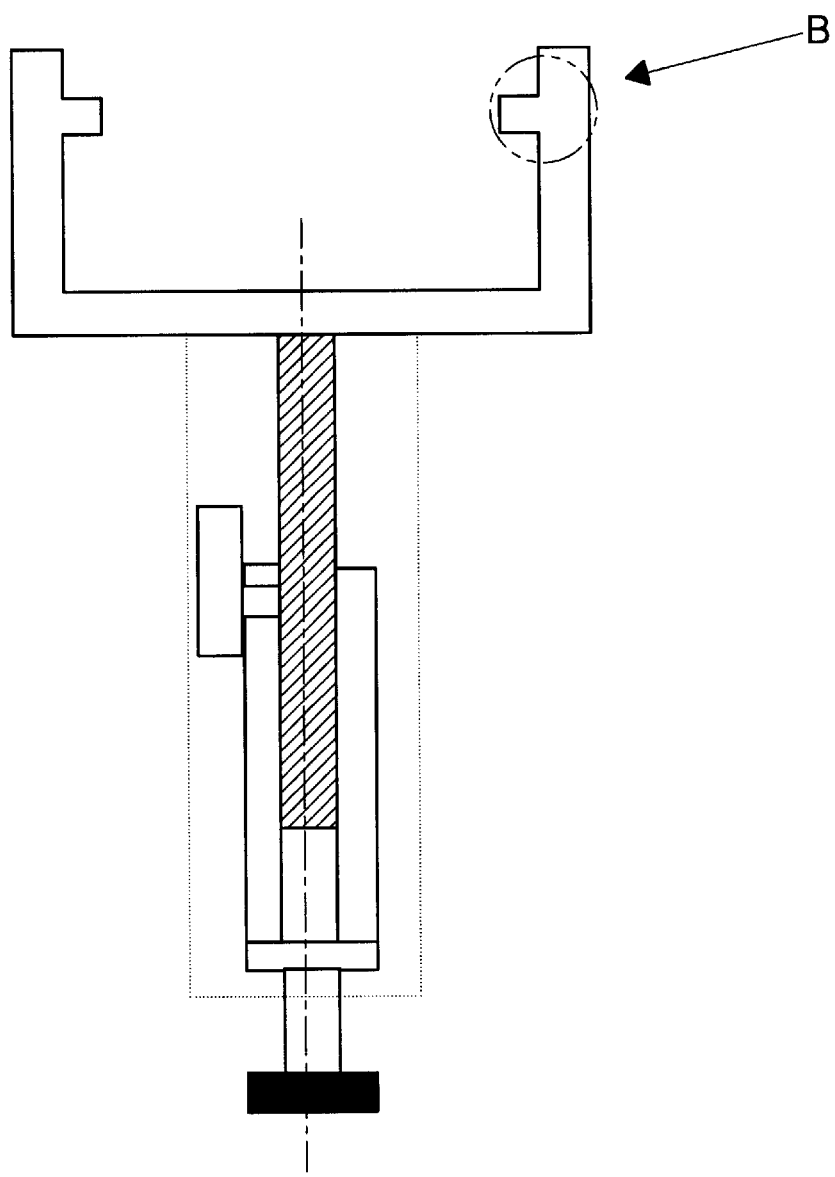
Figure 3D:
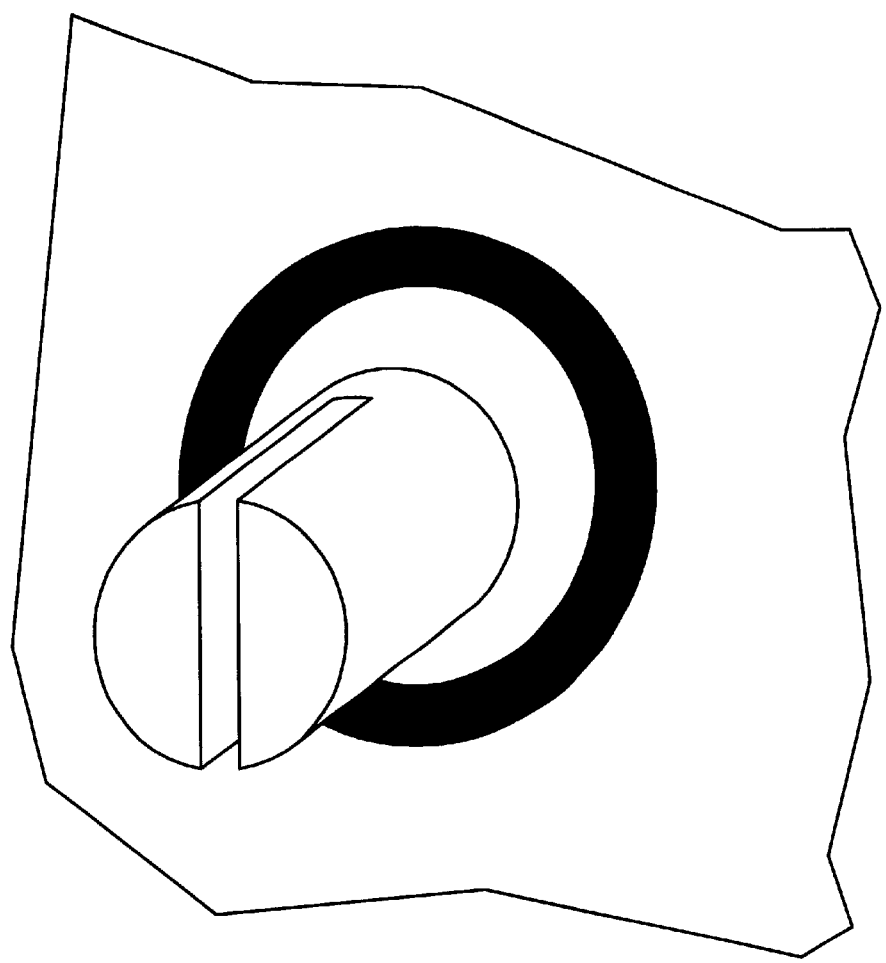

Reference now should be made to the drawings, in which the same reference numerals are used throughout the different drawings to designate the same or similar components.

Figure 4A:
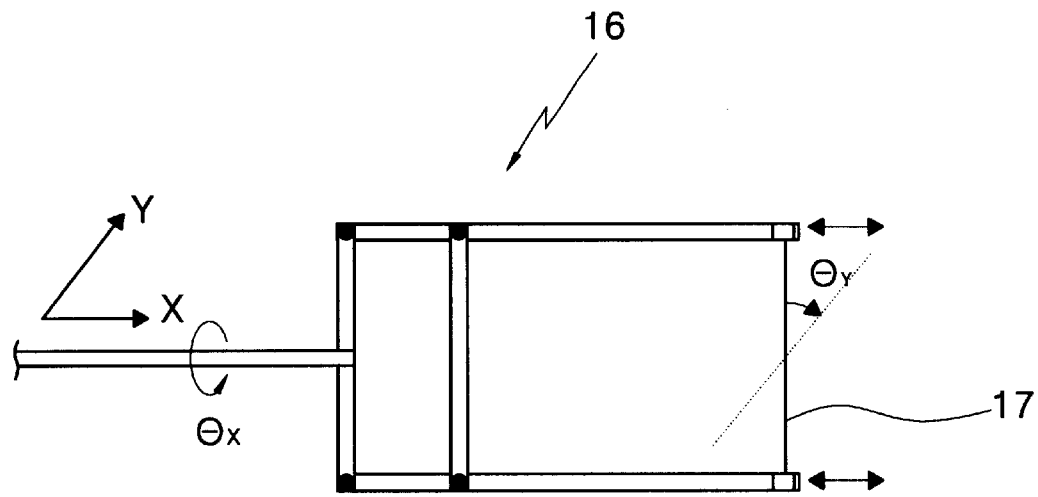
FIGS. 4a to 4d are views showing the hot-wire cutter of a variable lamination manufacturing apparatus of FIG. 2.
Figure 4B:
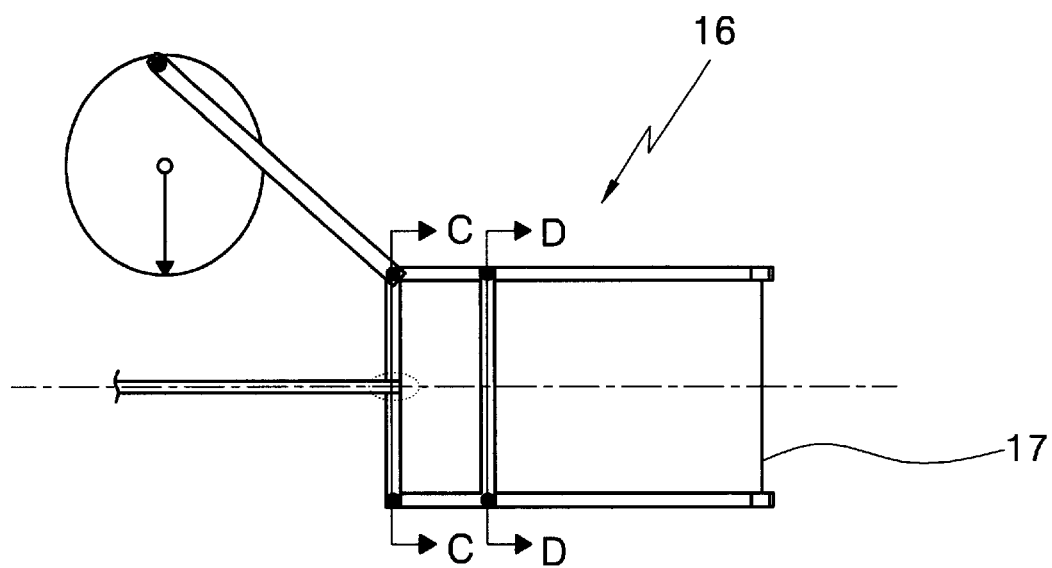
Figure 4C:
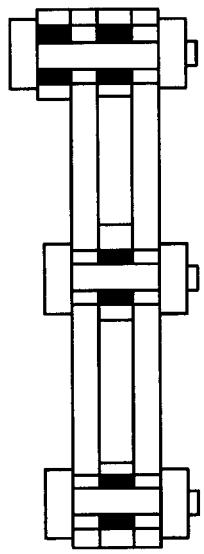
Figure 4D:
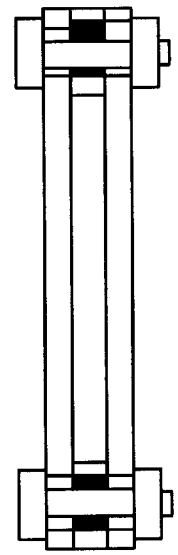
Figure 5:
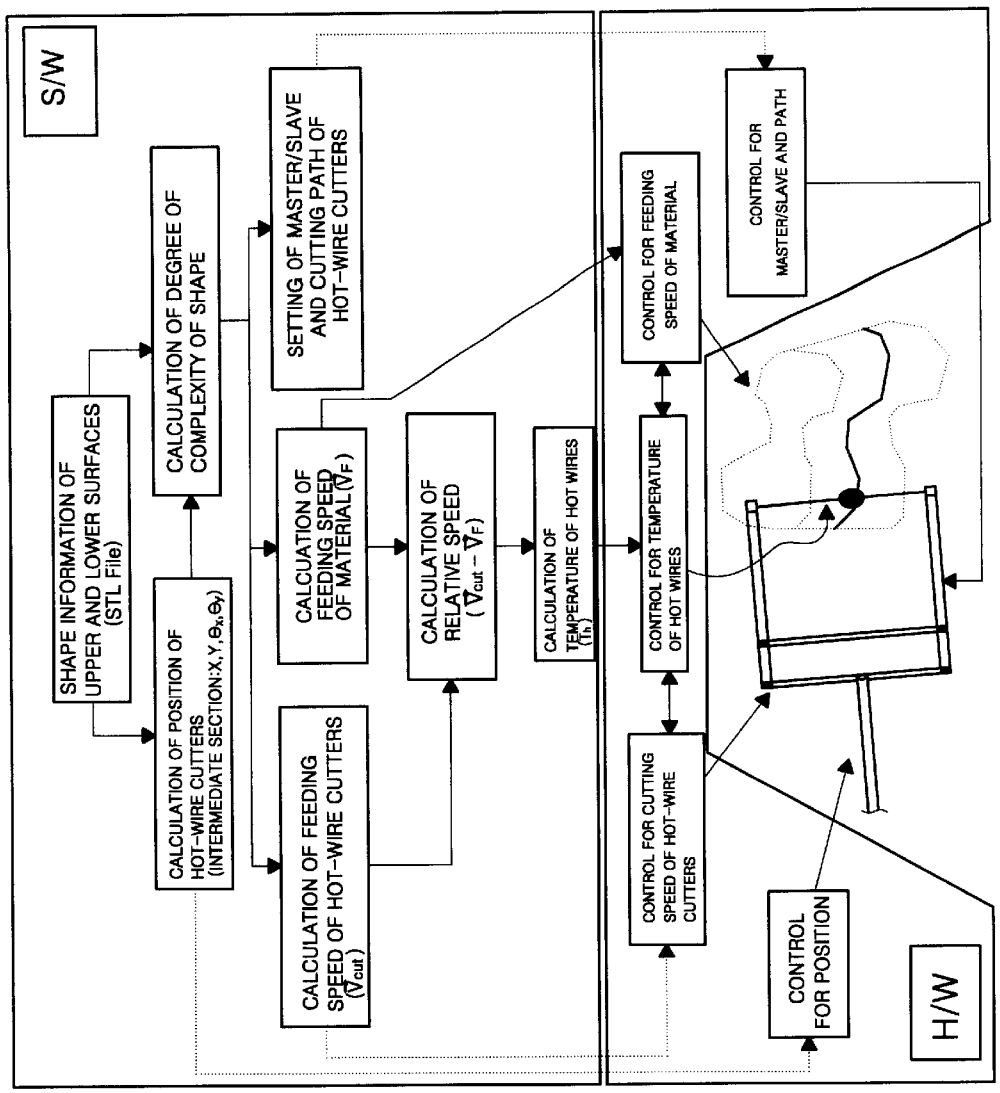
FIG. 5 is a block diagram of the controller for the hot-wire cutter of a variable lamination manufacturing apparatus of FIG. 2.
Figure 6:
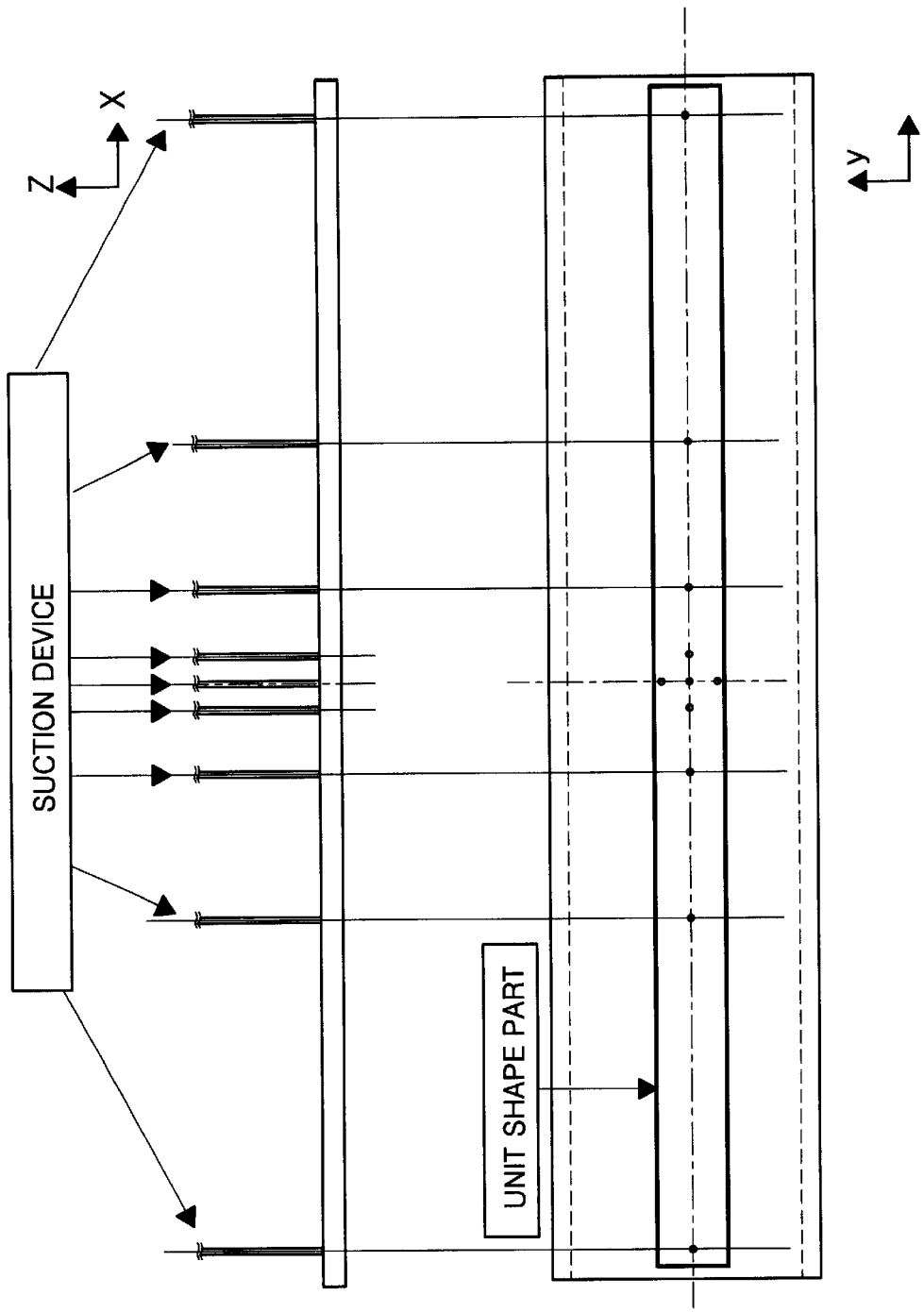
FIG. 6 is a view showing the piece holder of a variable lamination manufacturing apparatus of FIG. 2.
Figure 7:
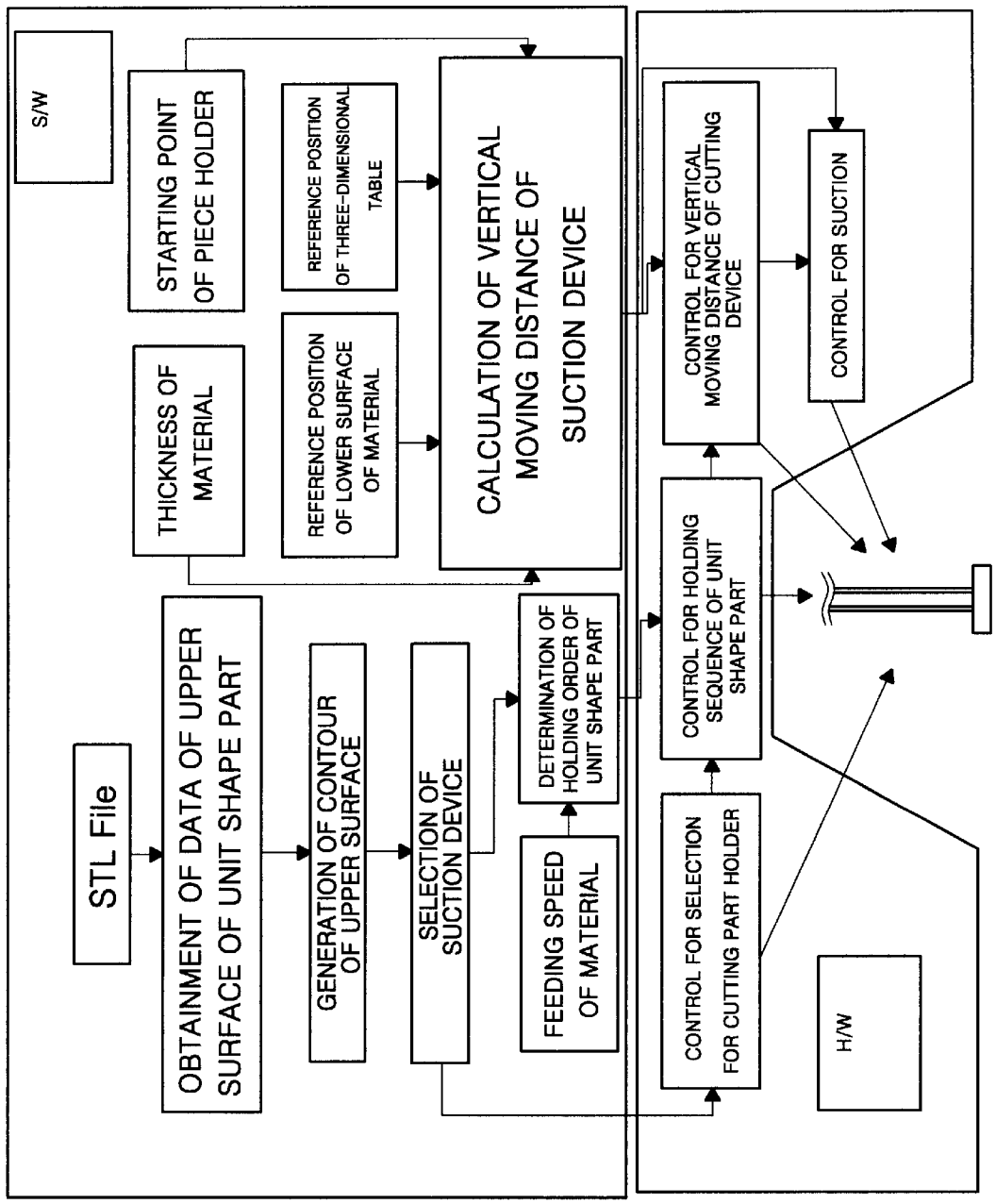
FIG. 7 is a block diagram of the controller for the piece holder of a variable lamination manufacturing apparatus of FIG. 2.
Figure 8:
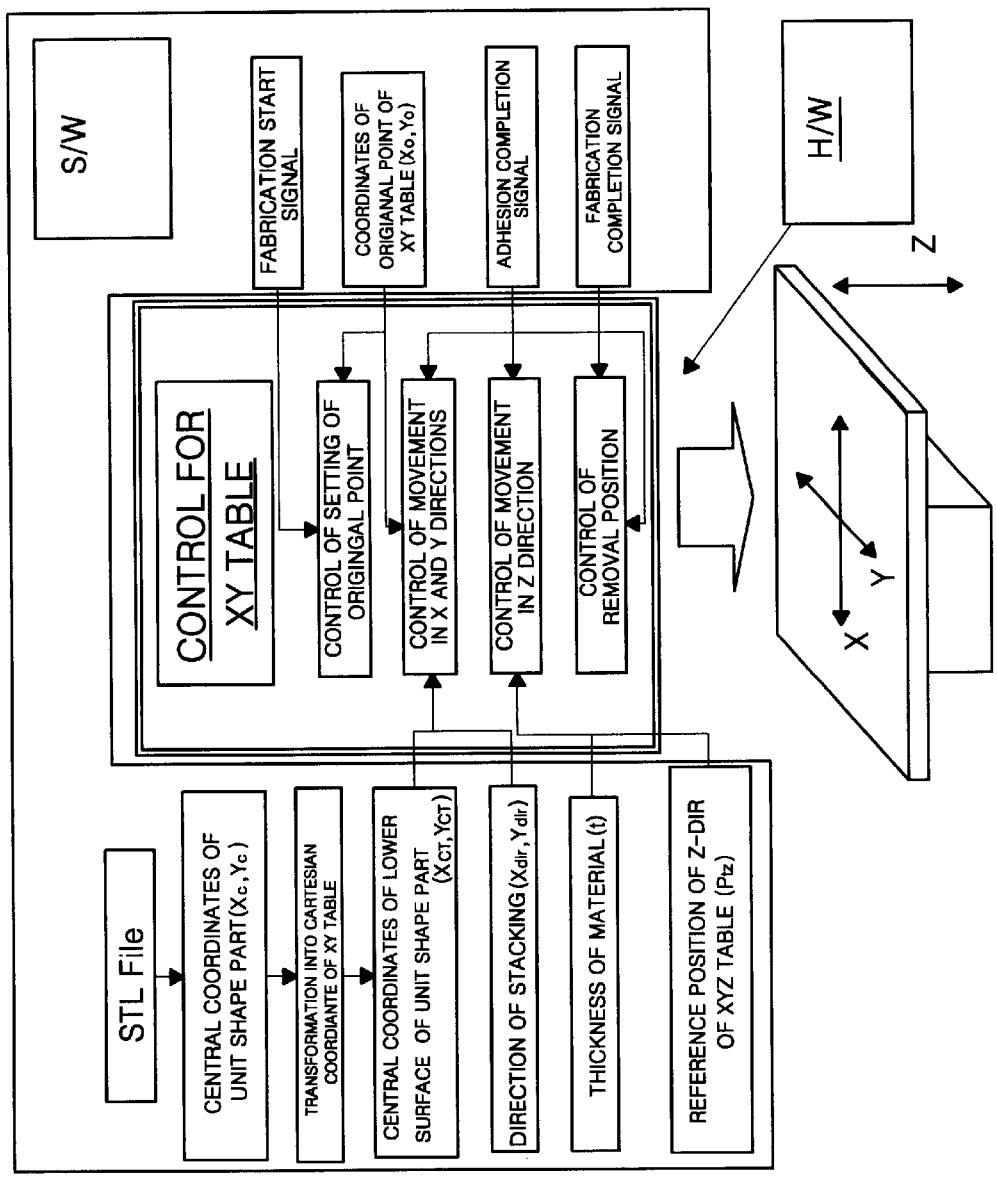
FIG. 8 is a block diagram of the controller for the three-dimensionally moving table of a variable lamination manufacturing apparatus of FIG. 2.
Figure 9A:
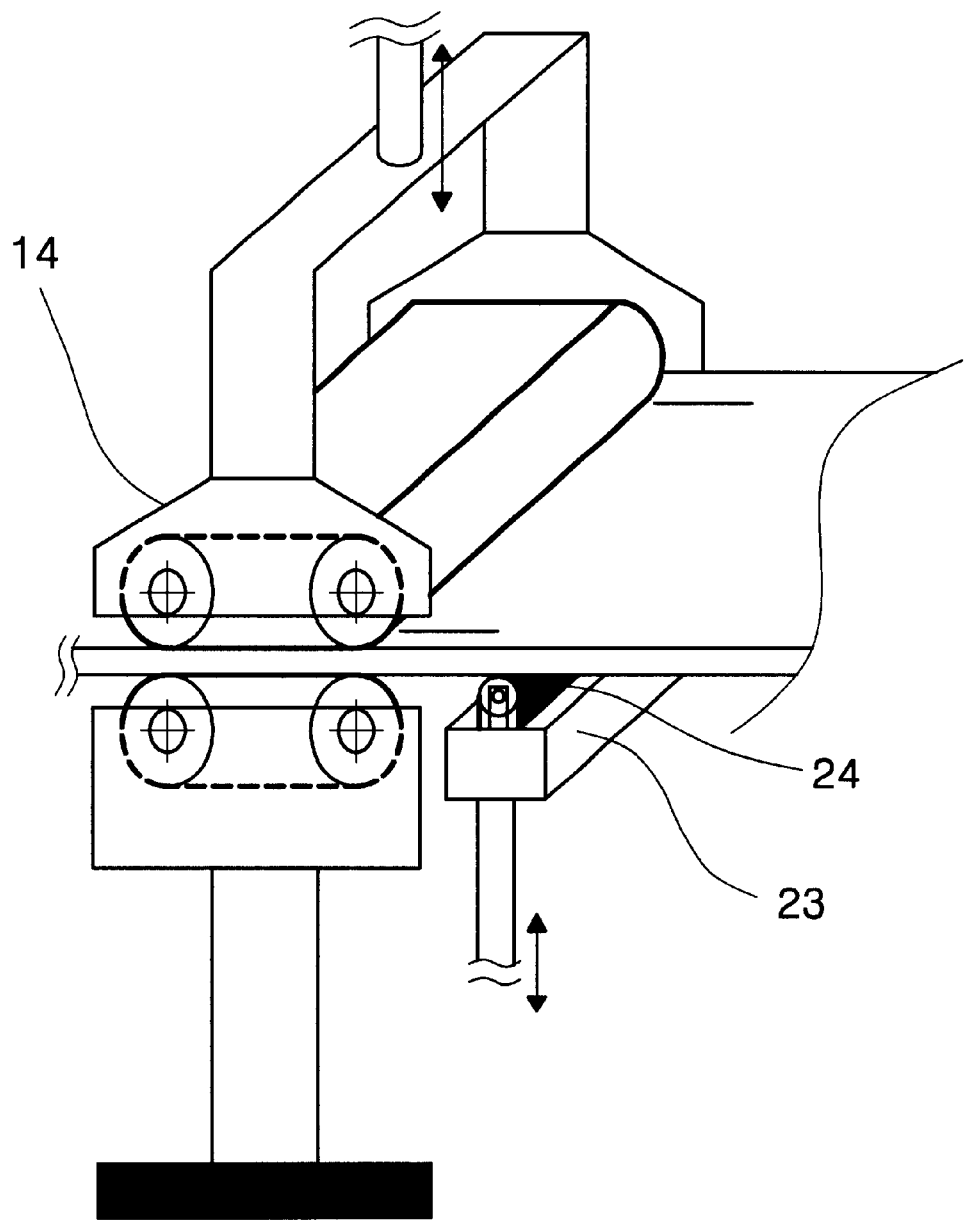
FIGS. 9a and 9b are schematic views showing the coating device of a variable lamination manufacturing apparatus of FIG. 2.
Figure 9B:
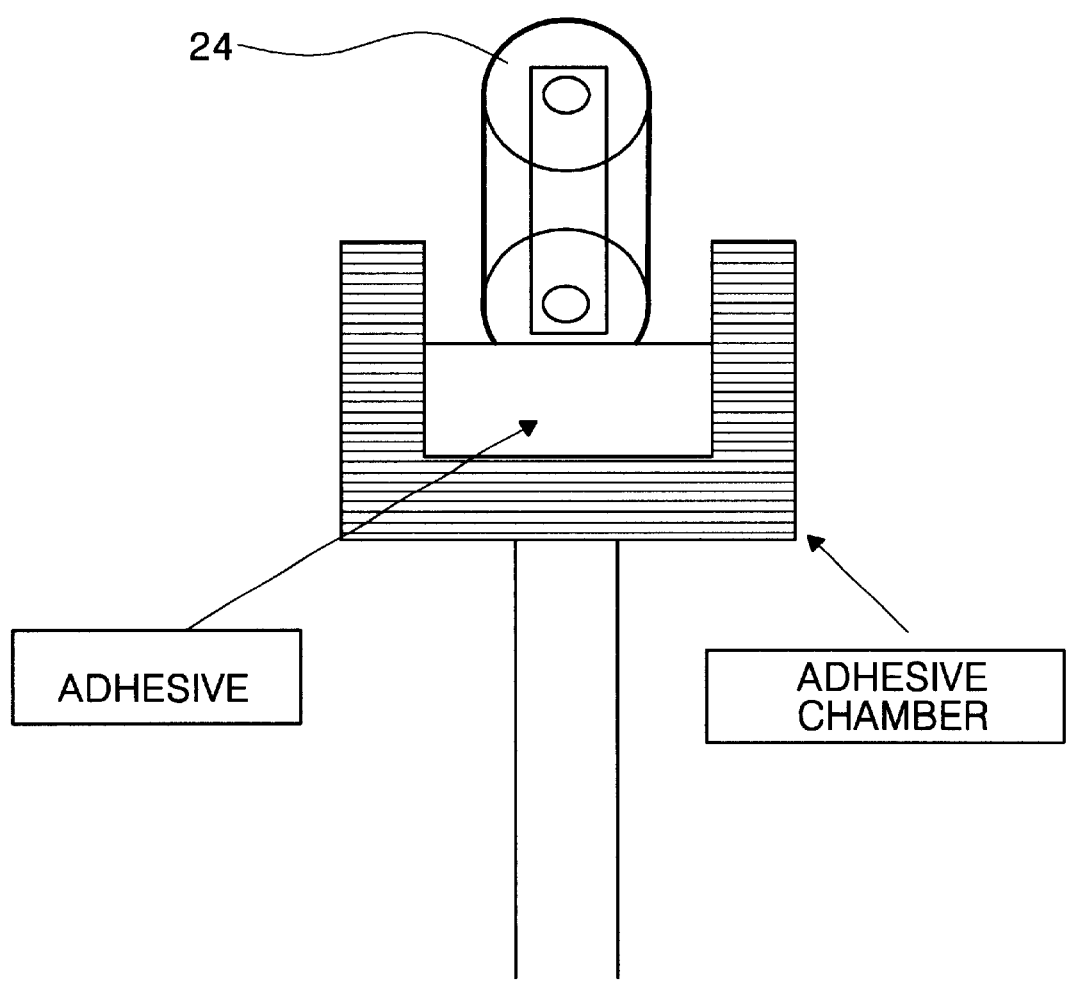
Figure 11:
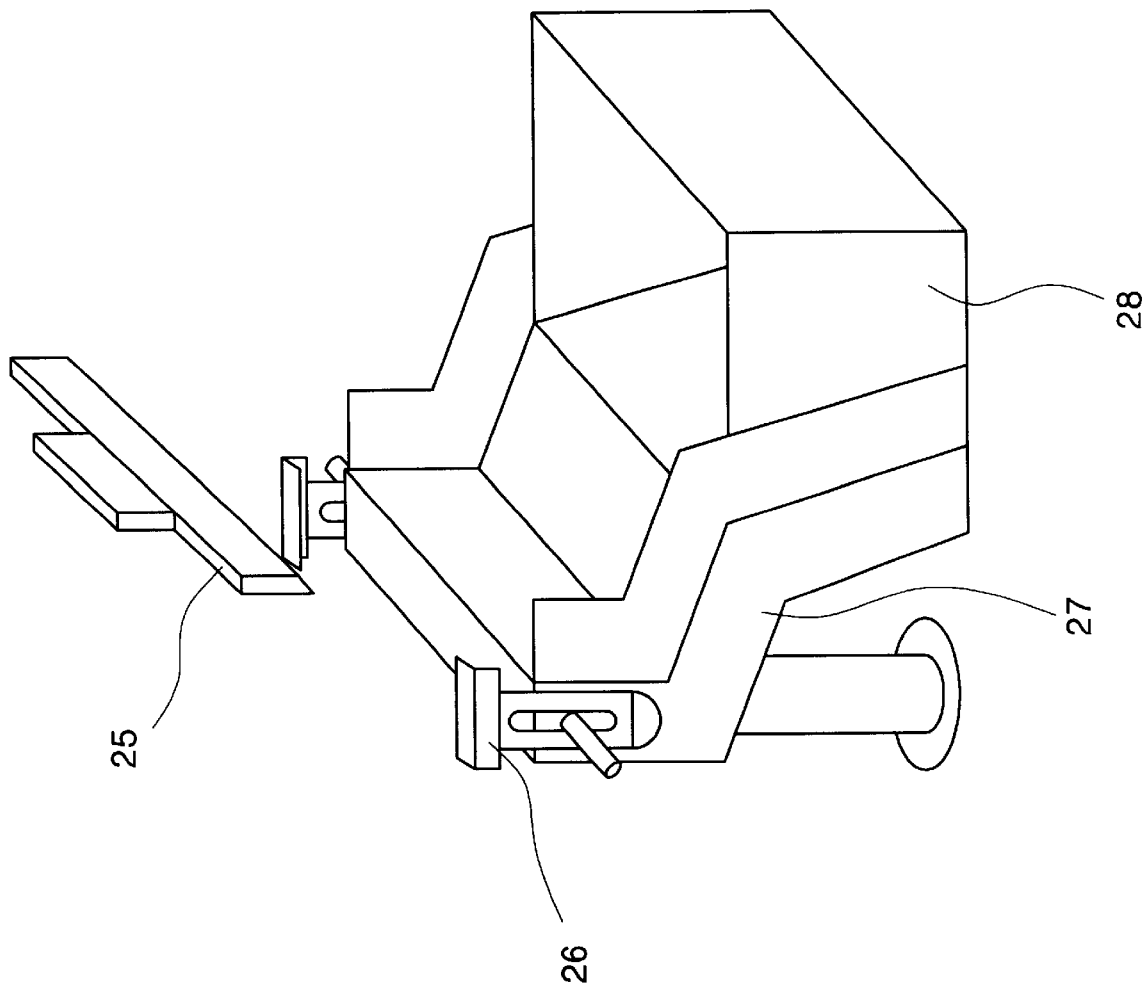
FIG. 11 is a view showing the chute and skeleton storage bin of a variable lamination manufacturing apparatus of FIG. 2.
Figure 12:
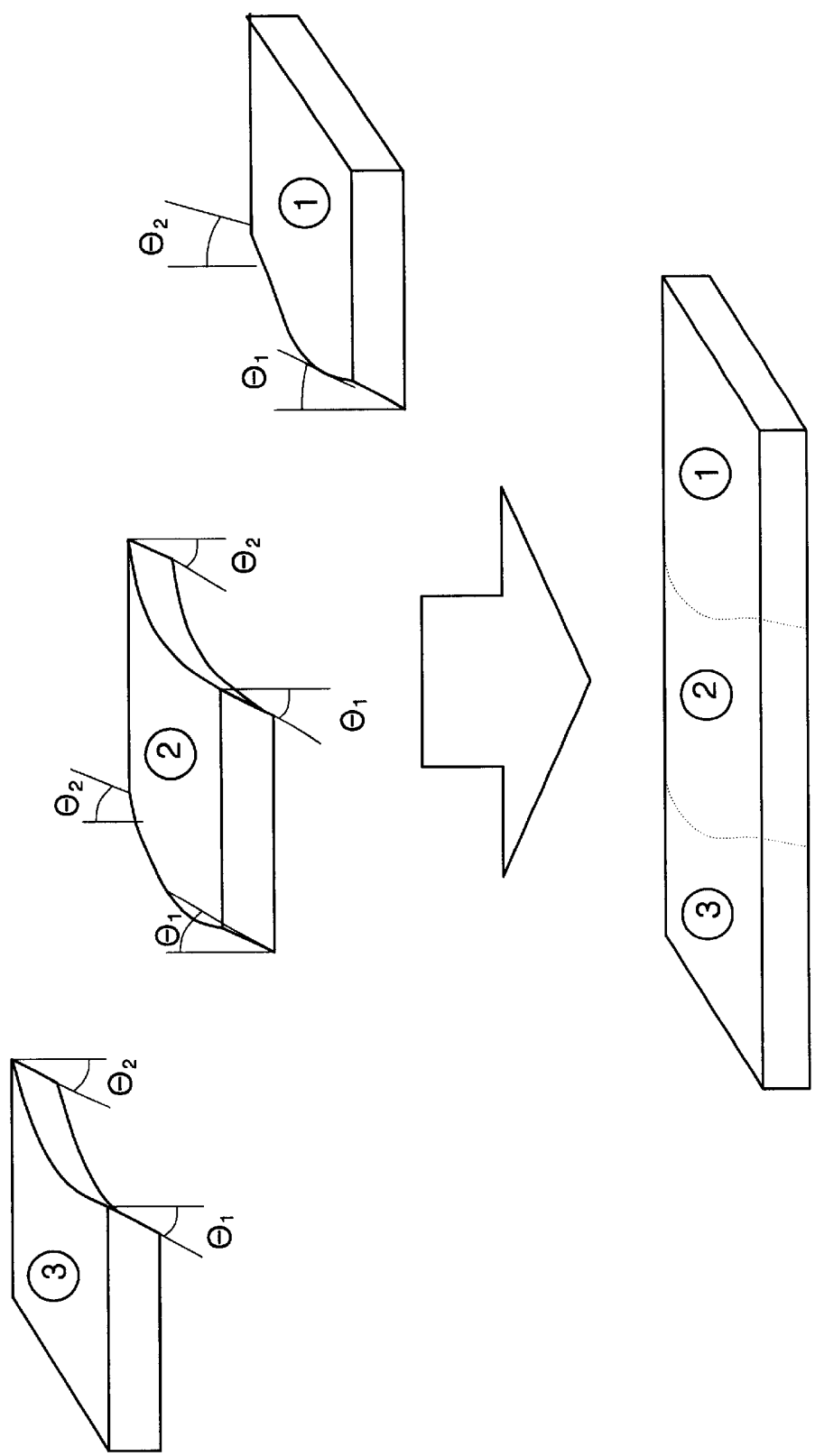
FIG. 12 is a diagram showing a technique of cutting the sides of unit shape part at predetermined inclinations.

FIG. 1 is a schematic diagram showing a variable lamination manufacturing process in accordance with the present invention. FIG. 2 is a schematic diagram showing a variable lamination manufacturing apparatus in accordance with the present invention. FIGS. 3a to 3d are views showing the material feed roll and roll support of a variable lamination manufacturing apparatus of FIG. 2. FIGS. 4a to 4d are views showing the hot-wire cutter of a variable lamination manufacturing apparatus of FIG. 2. FIG. 5 is a block diagram of the controller for the hot-wire cutter of a variable lamination manufacturing apparatus of FIG. 2. FIG. 6 is a view showing the cutting part holder of a variable lamination manufacturing apparatus of FIG. 2. FIG. 7 is a block diagram of the controller for the cutting part holder of a variable lamination manufacturing apparatus of FIG. 2. FIG. 8 is a block diagram of the controller for the three-dimensionally moving table of the variable lamination manufacturing apparatus of FIG. 2. FIGS. 9a and 9b are schematic views showing the coating device of the variable lamination manufacturing apparatus of FIG. 2. FIG. 10 is a view showing the pushing device of the variable lamination manufacturing apparatus of FIG. 2. FIG. 11 is a view showing the chute and skeleton storage bin of the variable lamination manufacturing apparatus of FIG. 2. FIG. 12 is a diagram showing a technique of cutting the sides of unit shape part at predetermined inclinations.

As illustrated in FIG. 2, a variable lamination manufacturing apparatus in accordance with the present invention includes a material feed roll 12, which stores strip-shaped material, such as foamed resin, thermoplastic resin and thermosetting resin, in a state where the material is wound around the material feed roll 12. The material feed roll 12 is supported by a feed roll support 11 to be vertically movable. The material wound around the material feed roll 12 is continuously or intermittently fed by a rear feeding device 14 and a front feeding device 15 while being passed through an adjusting roll 13.

A coating device 23 is positioned in the vicinity of the rear feeding device 14, and serves to continuously coat the lower surface of the material fed by the rear feeding device 14 with a bonding agent using its coating roller 24 to which the bonding agent adheres. Accordingly, the lower surface of the fed strip-shaped material is uniformly and entirely coated with the bonding agent.

Two hot-wire cutters 16 are disposed between the rear feeding device 14 and the front feeding device 15 to cut the fed strip-shaped material. The hot-wire cutters 16 are constructed to be adjustably moved in X, Y, θx, and θy directions, and serve to cut the fed strip-shaped material into material pieces each having an unit shape analogous to a shape in accordance with the computer aided design data of the product, using hot wires of a high temperature. When the material pieces are cut by the hot-wire cutters 16, the width, lateral inclinations and length of the piece are controlled during cutting.

A piece holder 18 is situated above the conveyed strip-shaped material, and serves to firmly hold a piece being cut while the strip-shaped strip is cut by the hot-wire cutters 16 into the piece. That is, while the strip-shaped material is cut by the hot-wire cutters 16 into the piece, the suction device 19 of the cutting part holder 18 is vertically downwardly moved and holds the piece being cut, thereby fixing the piece being cut and preventing the piece from being laterally vibrated. When the piece is completely cut, the cutting part Holder 19 is vertically downwardly moved additionally and places the unit shape part on a three-dimensionally moving table 21 situated under the strip-shaped material being conveyed. At this time, the unit shape part is positioned on the three-dimensionally moving table 21 in accordance with coordinates determined by the computer aided design data of the product.

The three-dimensionally moving table 21 is moved in a X-Y plane when the piece is machined in the same plane as that of the table 21 or is moved in a Z-axis direction when the unit shape part is machined in a different plane from that of the table 21, so as to situate the unit shape part at a position coinciding with the computer aided design data.

A pushing device 22 is disposed beside the three-dimensionally moving table 21. The pushing device 22 pushes an upper piece situated on the three-dimensionally moving table 21 by the holder 19 and coated with the bonding agent by the coating device 23 on its lower surface to be bonded to the upper surface of a lower piece situated under the upper piece.

An idle roller 20 is situated before the front feeding device 15 so as to supply a piece of thin paper to prevent the bonding agent coated on the skeleton from being smeared on the front feeding device 15 while the skeleton passes through the front feeding device 15.

A skeleton cutter 25 is situated after the front feeding device 15 to cut the skeleton except for pieces cut out of the original material by the hot-wire cutters 16. In such a case, the skeleton is fed along a movement guide 26 situated between the front skeleton device 25 and the skeleton cutter 25.

A skeleton storage bin 28 is situated after the skeleton cutter 25 to store the cut skeleton pieces after the cut skeleton pieces are conveyed through a chute 27.

Hereinafter, a variable lamination manufacturing process using the variable lamination manufacturing apparatus constructed as described above is described with reference to FIGS. 1 and 2.

When computer aided design data (*.DTL, *.IGES, *.dxf, etc.) are input to a control unit, the control unit controls the entire variable lamination manufacturing apparatus. That is, the control unit controls the feeding speed of the strip-shaped material wound around the material feed roll 12 using the rear and front feeding devices 14 and 15 (the rear and front feeding devices 14 and 15 constitute a material feed unit). The strip-shaped material being fed is cut by the hot-wire cutters 16 into a unit shape part, and the cut piece is fed to the three-dimensionally moving table 21 by the cutting part holder 18 (the hot-wire cutters 16 and the cutting part holder 18 constitute a trimming unit). The control unit controls the cutting speed Vs, cutting temperature T and cut shape information of the strip-shaped material. In such a case, the cut shape information denotes point coordinates (X, Y, Z) at a central position in a thickness direction, cutting angles ($\theta_1$, $\theta_2$) and master/slave information (the point coordinates (X, Y, Z), the cutting angles ($\theta_1$, $\theta_2$) and the master/slave information constitute shape information). In such a case, the master/slave information determines which of two hot wires 17 is to be used as a master or a slave.

The unit shape part fed to the three-dimensionally moving table 21 are stacked and bonded together in order (the three-dimensionally moving table 21 constitutes a stacking/bonding unit). On the other hand, the skeleton is cut by the skeleton cutter 25, and the cut skeleton pieces are stored in the skeleton storage bin 28 (the remaining material cutter 25 and the skeleton storage bin 28 constitute a skeleton cutting/storage unit).

The above-described processes are repeated till the product having a desired shape is completely fabricated.

Hereinafter, the operation of the variable lamination manufacturing apparatus and the variable lamination manufacturing process are described in more detail.

First of all, strip-shaped material, such as a foamed resin, thermoplastic resin or thermosetting resin is moved to the adjusting roll 13 from the material feed roll 12 supported by the feed roll support 11 to prevent the strip-shaped material from being damaged (such as by rumples or bends). In such a state, the strip-shaped material is continuously or intermittently fed by means of the rear and front feeding devices 14 and 15. At this time, the feeding speed and feeding length of the strip-shaped material is controlled by the control unit shown in FIG. 1.

At the same time that the strip-shaped material passes through the rear feeding device 14, the lower surface of the strip-shaped material, as depicted in FIGS. 9a and 9b, is uniformly coated with a bonding agent by means of the coating roller 24 of the coating device 23 positioned under the strip-shaped material being conveyed.

The strip-shaped material uniformly coated with the bonding agent is cut into unit shape part by means of the hot-wire cutters 16. At this time, the cutting speed Vs, cutting temperature T and cut shape information of each hot-wire cutters 16 are controlled by the control unit.

Two hot-wire cutters 16 are positioned to cut the strip-shaped material. As depicted in FIG. 4d, two wire cartridges are disposed on both sides of the strip-shaped material being conveyed, and two hot wires 17 are projected from the wire cartridges, respectively. Each hot-wire cutter 16 is constructed to enable translation and rotation with four-degree-of-freedom. The hot-wire cutter 16 can translate in X and Y-axis directions, and can rotate in θx and θy. Accordingly, the hot-wire cutters 16 are constructed to allow the hot wires 17 to freely cut the strip-shaped material into the unit shape part of a desired shape.

In order to cut the strip-shaped material into the unit shape part of a desired shape, the hot-wire cutters 16 should be operated by a controller for the hot-wire cutters 16 shown in FIG. 5. The software unit of the controller shown in FIG. 5 calculates the position coordinates (X, Y) of a central cross-section and lateral inclinations (θx, θy) using the shape information (STL file) of the upper and lower surfaces of a unit shape part, and calculates the degree of the complexity of a shape using the calculated position coordinates (X, Y) of the central cross-section and the calculated lateral inclinations (θx, θy). Additionally, the moving paths of the master/slave and the hot-wire cutters 16 are determined from the calculated degree of the complexity of a shape, and the relative speed $V_{Cut}$-$V_F$ of the strip-shaped material is calculated after the moving speed $V_{Cut}$ of the hot-wire cutters 16 and the conveying speed $V_F$ of the strip-shaped material are calculated. The temperature $T_n$ of the hot wires is obtained from temperature-relative speed relation empirically obtained. These results are input to the software unit of the controller for the hot-wire cutters 16 shown in FIG. 5 to operate the hot-wire cutters 16.

In cutting the unit shape part, the upper and lower surfaces of the unit shape part in an X-axis direction is cut at lateral inclinations ($\theta_1$, $\theta_2$) as shown in FIG. 12, so that the positioning of the unit shape parts is easily performed and the bonding force of the unit shape part is improved.

While the unit shape part is being cut by the hot-wire cutters 16 in accordance with the above-described procedure, the suction device 19 of the cutting part holder 18 is vertically moved to suck and hold the previously cut surface of the unit shape part that is cut by more than a half in an X-axis direction. After the unit shape part is completely cut, the unit shape part is placed at a position set on the three-dimensionally moving table 21. The cutting part holder 18 should be operated under the control of a controller for the cutting part holder 18 shown in FIG. 7 so as to cause the cutting part holder 18 to be vertically moved and hold the unit shape part.

The controller for the cutting part holder 18, as indicated in FIG. 7, receives the computer aided design data of the upper surface of the unit shape part, calculates the contour of the upper surface and selects the suction device 19 situated in the contour. Thereafter, the controller calculates the order of holding the unit shape part performed by the suction device 19. The vertical moving distance of the suction device 19 is calculated in consideration of the thickness of the material and the three-dimensional arrangement of the device. These calculated results are input to the hardware unit of the controller to operate the cutting part holder 18 and the suction device 19.

Thus cut unit shape parts are stacked on the three-dimensional table 21, and the three-dimensional table 21 is controlled by the controller shown in FIG. 8. The controller for the three-dimensionally moving table 21 receives the computer aided data of the lower surface of the unit shape part through the software unit and calculates the center coordinates of the lower surface of the unit shape part ($X_C$, $Y_C$). The controller transforms the center coordinates ($X_C$, $Y_C$) into coordinates on the three-dimensionally moving table 21 to calculate the center coordinates of the lower surface of the unit shape part ($X_{CT}$, $Y_{CT}$) on the three-dimensionally moving table 21. The moving distance of the three-dimensionally moving table 21 is calculated from the computer aided data in consideration of the direction of being stacked ($X_{dir}$ or $Y_{dir}$), the thickness of the fed material t and the three-dimensional arrangement of the device. The reason why the center coordinates of the lower surface of the unit shape part ($X_c$, $Y_c$) on the three-dimensionally moving table 21 are calculated through the transformation of coordinates is to prevent a stack error that may occur due to the discordance of stack coordinates. These results are input to the controller for the three-dimensionally moving table 21 shown in FIG. 8 to operate the three-dimensionally moving table 21.

When unit shape parts are stacked on the three-dimensionally moving table, the unit shape parts are pushed by the pushing device 22 shown in FIG. 10 so as to desirably bond one piece to another.

Accordingly, a product of a desired shape is finished.

The skeleton except for unit shape part cut from the fed strip-shaped material is fed by the front conveying device 15, cut into pieces by the skeleton cutter 25 as shown in FIG. 5, and stored in the skeleton storage bin 28. That is, the skeleton is cut by vertically moved skeleton cutter 25 when the skeleton portion passes through the movement guide 26, and the cut skeleton pieces are guided through the chute 27 and stored in the skeleton storage bin 28.

In accordance with the method and apparatus of the present invention, the product of a desired shape is fabricated by repeating the above-described procedures.

Although the strip-shaped material is shown and described as being cut by the hot wires, the strip-shaped material may be cut by a linear heat source, such as laser, plasma, heat beam, heated gas, or the like.

The variable lamination manufacturing process and apparatus of the present invention described above has the following differences in comparison with laminated object manufacturing and fused deposition modeling.

First, the variable lamination manufacturing process and apparatus of the present invention can be applied to foamed resin, thermoplastic resin, thermosetting resin, and all the material that can be cut by a linear heat cutting device.

Second, a product of a complicated shape can be fabricated at one time because a fabrication width and a fabrication length can be controlled during the fabrication of the product.

Third, the dimensional accuracy of a product can be considerably improved because the inclinations of the fabricated surfaces can be controlled during the fabrication of the product.

Fourth, a fabrication time is shortened in comparison with other techniques because strip-shaped material of various thicknesses can be fed.

Fifth, a layer of a product is formed by combining unit shape parts divided into regions and the other layers are formed in the same fashion, so that the post-processing of remaining material is scarcely required and the loss rate of material is reduced in comparison with the laminated object manufacturing.

COMPARISION TABLE

| Item | Laminated object manufacturing | Fused deposition modeling | Variable lamination manufacturing |
|---|---|---|---|
| Material | Paper | wax, ABS, MABS | foamed resin, thermoplastic resin, thermosetting resin |
| Bonding | use of bonding agent | electrical fusion-bonding | use of adhesive |
| Fabricating unit | Plane | line | Piece |
| Fabricating width | set in advance | set by Multiple lines | controllable during fabrication |
| Fabricating inclination | step type | step type | controllable during fabrication |
| Fabricating thickness | thickness of paper | thickness of line | various thicknesses |
| Field | lab/factory | office/lab | office/lab/factory |

As described above, in the variable lamination manufacturing process and apparatus of the present invention, a three-dimensional product is fabricated in such a way that strip-shaped material of variable thickness and width is fed and cut by a four-degree-of-freedom linear heat cutting device into the unit shape part of variable width, inclination and length, and the cut unit shape parts are combined into the product, thereby considerably increasing the fabricating speed of the product.

In addition, the variable lamination manufacturing process and apparatus can allow the strip-shaped material to be cut into unit shape parts using the linear heat cutting device while the width, lateral inclination and length are controlled, thereby improving the dimensional accuracy of the product.

Additionally, the variable lamination manufacturing process and apparatus can fabricate a product by combining a plurality of cut pieces, so that the loss of material can be minimized and excessive post-processing is scarcely required due to the obviation of the necessity of eliminating the skeleton.

Furthermore, the variable lamination manufacturing process and apparatus can employ foamed resin, thermoplastic resin, thermosetting resin and all materials which can be cut by a linear heat cutting device as fabrication material, so that it can be utilized in various industrial uses, such as the fabrication of architectural models, trial products, character products, cores for lost foam casting or the like.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A variable lamination manufacturing method, comprising the steps of:

coating strip-shaped material with an adhesive while the strip-shaped material is fed, the strip-shaped material being relatively thick;

cutting the strip-shaped material being fed into material pieces of a variable inclination along the perimeter with respect to sides of the material pieces and a variable length in accordance with three-dimensional computer aided design data of a three-dimensional reference product using a linear heat source;

stacking the material pieces on a moving table to be positioned in corresponding positions to form the three-dimensional product; and pushing the material pieces on the moving table to bond and form one layer.

2. The method according to claim 1, further comprising the step of storing a skeleton which is the unused remainder of the strip shaped material.

3. The method according to claim 1, wherein said linear heat source is one of hot wire, plasma, heat beam and heated gas.

4. The method according to claim 1, wherein said strip-shaped material is one of foamed resin, thermoplastic resin and thermosetting resin.

5. The method according to claim 1, wherein said three dimensional product has a profile shape formed by connecting the variable inclinations of the neighboring material pieces, the variable inclinations conform to the profile shape of the three-dimensional reference product.

6. A variable lamination process for forming a three dimensional product from strip-shaped material to correspond to three dimensional computer aided design data of a three dimensional reference product comprising the steps of:

a) supplying a source of strip-shaped material;

b) coating a surface of said strip-shaped material with an adhesive;

c) cutting said strip-shaped material into material pieces with a linear heat source in accordance with said three dimensional computer aided design data, said cutting being along a perimeter of said strip-shaped material to create variable widths, lengths and variable inclinations;

d) stacking and positioning said material pieces on a moving table into the positions which correspond to said three dimensional reference product; and e) pushing said material pieces together to bond together as a unit.

* * * * *